Patented May 3, 1938

2,115,710

UNITED STATES PATENT OFFICE 2,115,710

MANUFACTURE OF COMPOSITIONS AND ARTICLES CONTAINING PLASTICIZABLE SUBSTANCES AND NEW PLASTICIZERS

Henry Dreyfus, London, England

No Drawing. Original application February 8, 1934, Serial No. 710,347. Divided and this application February 4, 1937, Serial No. 124,133. In Great Britain February 17, 1933

11 Claims. (Cl. 106—40)

This invention relates to the manufacture of compositions and articles made of or containing plasticizable substances, such as derivatives of cellulose and synthetic resins, and a new class of plasticizer, and this application is a divisional of application S. No. 710,347 filed 8th February 1934.

The plasticizers of the present invention are esters of polycarboxylic acids, containing one or more methylene glycol residues. By a methylene glycol residue is meant a residue derivable by the removal of a hydroxy group from the hypothetical methylene glycol or its monoethers or esters, for example, monomethyl methylene glycol (methoxymethanol), mono-acetyl methylene glycol (oxymethyl acetate) or monochlor methanol. The term methylene glycol residue includes residues in which one or more hydrogen atoms are substituted, for example by halogen atoms. The term polycarboxylic acids is used to denote acids containing more than one carboxyl group, and includes dicarboxylic acids of the carbocyclic series, for example phthalic acid and its substitution products, and of the aliphatic series for example succinic, malonic, glutaric, and tartaric acids.

The esters of the invention are new chemical substances, and are claimed in my co-pending application S. No. 710,347.

The esters may contain two identical methylene glycol residues, or two methylene glycol residues which, without being identical, are similar in constitution, for example methoxy-methyl and ethoxy-methyl. On the other hand, the esters may contain two entirely different methylene glycol residues, for example an alkoxy-methylene and an acidyl-oxy-methylene glycol residue. Further, the ester may contain in addition to a methylene-glycol residue a hydrocarbon residue or a residue of a dihydric alcohol containing more than one carbon atom, for example a substituted or unsubstituted residue derivable from ethylene glycol or its monoesters or ethers by the removal of one hydroxy group. In such compounds the dihydric alcohol residue may or may not be similar in constitution to the methylene glycol residue.

The new esters may be made by reaction between a substituted methanol (which may be regarded as a hydroxy compound of a methylene glycol residue as defined above) or its equivalent and the acid, anhydride or acid halide. As an example of an equivalent of a substituted methanol may be mentioned formaldehyde and water which may be employed in place of the hypothetical methylene glycol. Another method of preparation of the esters is by reaction between a mono-halide of a methylene glycol residue (in other words, a derivative of a halogenated methanol) and a mono- or dimetallic salt of the acid.

Another method is the partial hydrolysis of esters in which at least two carboxyl groups in the polycarboxylic acid are esterified with methylene glycol residues, or with a methylene glycol residue and a different and more readily removable group. In a further method esters of polycarboxylic acids with a methylene glycol residue which is itself further esterified with a group which is more easily removed by saponification than is the methylene glycol residue from the polycarboxylic acid may be subjected to a regulated and partial hydrolysis.

As examples of esters containing simple oxymethylene glycol residues, reference may be made to oxy-methyl phthalic acid, obtainable from phthalic anhydride, formaldehyde and water in the presence of a suitable catalyst, for example hydrochloric acid gas, or by partial hydrolysis of di-(oxy-methyl) phthalate or mono-(acetoxy methyl) phthalate; di-(oxy-methyl) phthalate, obtainable by saponification of di-(acetoxy methyl) phthalate; and of methyl-(oxy-methyl) phthalate obtainable by saponification of methyl-(acetoxy-methyl) phthalate.

Esters containing alkoxy-methyl groups may be illustrated by reference to mono-(methoxy-methyl) phthalate obtainable from mono-chlor dimethyl ether and mono-sodium phthalate; di-(methoxy-methyl) phthalate obtainable from mono-chlor dimethyl ether and di-sodium phthalate; methoxy-methyl-(ethoxy-methyl) phthalate obtainable from mono-chlor methyl ethyl ether and sodium-(methoxy-methyl) phthalate; methyl- (methoxy-methyl) phthalate obtainable from mono-chlor methyl ether and sodium methyl phthalate; methoxy - methyl - (acetoxy-ethyl) phthalate obtainable from mono-chlor dimethyl ether and sodium-(acetoxy-ethyl) phthalate; ethoxy methyl-(acetoxy-ethyl) phthalate obtainable from mono-chlor-methyl ethyl ether and sodium-(acetoxy-ethyl) phthalate; methoxy-methyl-(oxy-ethyl) phthalate obtainable from monochlor dimethyl ether and sodium-(oxy-ethyl) phthalate; and ethoxy-methyl-(oxy - ethyl) phthalate obtainable from mono-chlor-methyl ethyl ether and sodium-(oxy-ethyl) phthalate.

Examples of esters containing acidyl-oxymethylene glycol residues are: mono-(acetoxy methyl) phthalate obtainable from mono-chlormethyl acetate and mono-sodium phthalate; di-(acetoxy-methyl) phthalate obtainable from mono-chlor-methyl acetate and di-sodium phthalate; methyl-(acetoxy-methyl) phthalate obtainable from sodium methyl phthalate and mono-chlor-methyl acetate; acetoxy-methyl-(acetoxy-ethyl) phthalate obtainable from monochlor-methyl acetate and sodium-(acetoxy-ethyl) phthalate; and acetoxy-methyl-(oxy-ethyl) phthalate obtainable from mono-chlor methyl acetate and sodium-(oxy-ethyl) phthalate.

As indicated above, the esters may contain two different methylene glycol residues. Among such compounds mention may be made of methoxymethyl-(acetoxy-methyl) phthalate, obtainable from mono-chlor-methyl acetate and sodium-(methoxy-methyl) phthalate, or from mono-chlor dimethyl ether and sodium-(acetoxy-methyl) phthalate; and ethoxy-methyl-(acetoxy-methyl) phthalate obtainable from mono-chlor-methyl ethyl ether and sodium-(acetoxy-methyl) phthalate, or from mono-chlor-methyl acetate and sodium-(ethoxy-methyl) phthalate.

In the preceding examples the new class of plasticizers is illustrated with particular reference to phthalic acid derivatives, since esters of this acid are among the most important of the new plasticizers. Valuable plasticizing properties are possessed by esters of analogous composition to those specified above, but containing succinic acid or other dicarboxylic acids in place of phthalic acid. Such esters may be obtained by methods analogous to those outlined above, i. e. from hydroxy compounds of the methylene glycol residues and the acid, anhydride or acid halide, from monohalides of methylene glycol residues and mono- or di-metallic salts of the acids or by the partial hydrolysis of esters as described. Esters containing alkyl or aryl halogen-substituted groups are not excluded and may in fact be of particular value for certain purposes, by reason of their halogen content. Thus the presence of halogens in such compounds in general tends to increase their resistance to fire, a property which is of considerable value in compositions containing inflammable substances such as nitrocellulose.

Those esters are to be preferred which do not give an acid reaction even after long storage or use. Should it, however, appear desirable for some special purposes to make use of esters which are acid or may develop acidity, anti-acid bodies, for example tetramethyl urea and similar alkylated amino bodies may with advantage be included in compositions containing the esters.

The invention includes the application of the new plasticizers generally in the manufacture of articles or materials comprising cellulose acetate, nitrocellulose, synthetic resins and like plasticizable substances, for example by moulding, extrusion, evaporation of solvent, coagulation by liquid media, spreading or spraying methods, and includes products, materials and compositions of matter which contain the plasticizers or in the manufacture of which the plasticizers are used, for example moulding powders, moulded or extruded articles, sheets, films, ribbons, filaments, artificial paper, artificial leather, splinterless glass, lacquers, varnishes, enamels and coating compositions generally, whether for application to fibrous or non-fibrous materials.

The new esters are of particular value when the plasticizable material comprises an organic ester of cellulose, for example an ester such as cellulose formate, propionate, butyrate and particularly cellulose acetate, or an ether such as methyl, ethyl or benzyl cellulose. The cellulose esters or ethers may be esterified or etherified to any desired degree, for instance I may employ cellulose acetates having an acetyl content lying between that of the triacetate and the diacetate, such as the esters obtainable by hydrolyzing or "ripening" a triacetate to an acetyl content in the neighbourhood of 58% combined acetic acid, or till it becomes soluble in acetone. The cellulose derivative may have any desired viscosity characteristics according to the purpose for which it is to be employed. In the production of lacquers and other coating compositions cellulose derivatives of relatively low viscosity may generally be used. Where, however, tensile strength is a desideratum in the product, it is preferable to employ esters of high viscosity. The production of such esters is described in U. S. Patent No. 1,708,787.

The products and compositions of the invention may contain natural or synthetic resins, for example shellac, dammar, phenol aldehyde resins of the soluble fusible type whether in the Novolak or Resol stage, and soluble fusible resins from other starting materials, for instance from diphenylol propane and formaldehyde or from other aldehydes, from urea or thiourea and formaldehyde, and particularly synthetic resins of the polymerized vinyl ester type, for example polymerized vinyl acetate.

Many of the compositions will naturally contain in addition to the new plasticizers and the plasticizable material volatile solvents or solvent mixtures therefor. For example, liquid compositions containing cellulose acetate may contain acetone, methyl ethyl ketone, ethyl formate, dioxane and other volatile solvents. High boiling solvents, for example cyclohexanone, ethyl lactate, diacetone alcohol, benzyl alcohol and cyclohexanol may also be present. The compositions may contain latent solvents for the cellulose derivative, for example ethyl alcohol, methyl alcohol and other aliphatic alcohols of low molecular weight, ethylene and methylene chloride and other aliphatic halogenated hydrocarbons. There may be present two or more latent solvents which together form a solvent mixture for the cellulose acetate, for example mixtures of ethyl or methyl alcohols with ethylene or methylene dichlorides. The compositions may moreover contain diluents or non-solvents for the cellulose derivative, for example benzene, toluene or any of the three xylenes, cumene, cymene or other hydrocarbons of low, medium or high boiling point. For example, coating compositions may contain in addition to plasticizable material and one or more of the new plasticizers, a low boiling solvent for the material, a medium boiling non-solvent therefor with or without additional high boiling solvents or plasticizers, for example, glycerin, triacetin, tributyl phosphate, triphenyl phosphate, tricresyl phosphate, dibutyl tartrate, triphenylol propane or a plasticizer of the sulphonamide or sulphonanilide series. Non-inflammators may also be present and these may themselves function as plasticizers, as do, for example, tri-brom acetanilide and other halogenated acidylated aromatic amines.

Solvents, latent solvents, diluents and non-solvents for the plasticizable material may be employed in the manufacture even of solid products. For example in the manufacture of filaments, ribbons and the like by evaporative processes, the dope will in general contain, in addition to the plasticizable material and a relatively small proportion of plasticizer, a relatively large proportion of a volatile solvent or solvent mixture. The solvent mixture may comprise two or more latent solvents which together form a solvent mixture and/or may contain suitable non-solvents, provided these are not present in sufficient quantity to cause precipitation of the plasticizable material at too early a stage in the evaporation. Dopes for the production of filaments, ribbons, films and the like by the wet process may also contain such liquids, though in this case it is not of course necessary that the major part of the solvent or solvent mixture should be volatile, the essential being that a sufficient proportion of the solvent should be removable by the coagulating medium.

The plasticizers may be introduced into the product, material or composition at any convenient stage in the manufacture thereof and by any convenient means. In the case of solid products formed from liquid compositions or dopes, for example by extrusion, evaporation, coagulation by liquid media or by spreading, it may be convenient to introduce the plasticizers into the dope directly or in solution or suspension in a suitable liquid. In the manufacture of moulding powders and the products made therefrom, the plasticizer may conveniently be introduced in the process of malaxation or may be sprayed on to the cellulose derivative in the form of a solution in a volatile solvent, as described in U. S. Patents Nos. 1,999,405 and 1,953,956.

Other constituents of the products, materials or compositions may include oils, waxes, filling agents, white or coloured pigments, organic colouring agents, and/or substances adapted to produce particular effects, e. g. pearl essence and powdered metals. The materials may be subjected to after treatments with a view to changing their physical or even chemical characteristics, according to the properties required.

The following examples illustrate the invention, which is in no way limited thereby:—

Example 1

A cellulose acetate plastic composition containing as plasticizer di-(acetoxy-methyl) phthalate may be made up as follows. 30 parts of the di-(acetoxy-methyl) phthalate are dissolved in 120 parts of a 50:50 alcohol benzene mixture, and the solution is thoroughly incorporated with 100 parts of acetone soluble cellulose acetate; the incorporation is effected by means of malaxating rollers, the solvent being removed by evaporation in the usual way. The plasticized mass thus produced may be employed for the manufacture of moulded products of any desired form.

Example 2

A composition which may be employed for the formation of lacquers or insulating coatings is:—

| | Parts |
|---|---|
| Cellulose acetate | 60 |
| Polymerized vinyl acetate | 40 |
| Methoxy methyl (ethoxy-methyl) phthalate | 35 |
| Acetone | 500 |
| Benzene | 250 |
| Alcohol | 250 |

Example 3

Another composition that is suitable for the formation of lacquers is:—

| | Parts |
|---|---|
| Nitrocellulose | 100 |
| Diphenylol propane formaldehyde resin | 15 |
| Methyl (acetoxy-methyl) phthalate | 25 |
| Triphenyl phosphate | 10 |
| Butyl acetate | 1000 |
| Acetone | 100 |

Example 4

The following composition is very suitable for producing highly flexible films or coatings which may be used for covering rubber insulated cables or the like:—

| | Parts |
|---|---|
| Cellulose acetate | 100 |
| Diphenylol propane formaldehyde resin | 20 |
| Dibutyl tartrate | 200 |
| Ethoxy methyl-(acetoxy-methyl phthalate | 80 |
| Acetone | 400 |
| Dioxane | 250 |

Having described my invention, what I desire to secure by Letters Patent is:—

1. Compositions and articles containing plasticizable substances such as stable cellulose derivatives and synthetic and natural resins and esters of polycarboxylic acids, said esters containing at least one acylated methylene glycol residue linked as an alcohol radicle to the acid radicle.

2. Compositions and articles containing organic derivatives of cellulose and esters of polycarboxylic acids, said esters containing at least one acylated methylene glycol residue linked as an alcohol radicle to the acid radicle.

3. Compositions and articles containing cellulose acetate and esters of polycarboxylic acids, said esters containing at least one acylated methylene glycol residue linked as an alcohol radicle to the acid radicle.

4. Compositions and articles containing plasticizable synthetic resins and esters of polycarboxylic acids, said esters containing at least one acylated methylene glycol residue linked as an alcohol radicle to the acid radicle.

5. Compositions and articles containing vinyl synthetic resins and esters of polycarboxylic acids, said esters containing at least one acylated methylene glycol residue linked as an alcohol radicle to the acid radicle.

6. Compositions and articles containing organic derivatives of cellulose and esters of phthalic acid, said esters containing at least one acylated methylene glycol residue linked as an alcohol radicle to the acid radicle.

7. Compositions and articles containing organic derivatives of cellulose and esters of polycarboxylic acids, said esters containing at least two methylene glycol residues linked as alcohol radicles to the acid radicle, at least one of said methylene glycol residues being acylated.

8. Compositions and articles containing organic derivatives of cellulose and esters of phthalic acid, said esters containing two methylene glycol residues linked as alcohol radicles to the acid radicle, at least one of said methylene glycol residues being acylated.

9. Compositions and articles containing cellulose acetate and esters of phthalic acid, said esters containing at least one acylated methylene glycol residue linked as an alcohol radicle to the acid radicle.

10. Compositions and articles containing cellulose acetate and esters of phthalic acid, said esters containing two identical acylated methylene glycol residues linked as alcohol radicles to the acid radicle.

11. Compositions and articles containing cellulose acetate and esters of phthalic acid said esters containing an acylated methylene glycol residue and an alkyl group linked as alcohol radicles to the acid radicle.

HENRY DREYFUS.